United States Patent Office 3,392,809
Patented July 16, 1968

3,392,809
DISC BRAKES
Harold Hodkinson, Finham, near Coventry, and Anthony Colin Evans, Binley, Coventry, England, assignors to Dunlop Rubber Company Limited, London, England, a corporation of Great Britain
Continuation of application Ser. No. 506,151, Nov. 3, 1965. This application Aug. 24, 1967, Ser. No. 663,165
Claims priority, application Great Britain, Nov. 4, 1964, 44,883/64
8 Claims. (Cl. 188—73)

ABSTRACT OF THE DISCLOSURE

This invention comprises a disc brake in which the friction elements are axially mounted for slidable movement on two spaced relatively fixed guide members which extend over the periphery of the disc, and an axially movable rigid caliper including an axially movable actuator in one limb thereof disposed between the guide members and acting against one of the friction elements, the reaction force of applying said one friction element being used for displacing said caliper and the limb associated with the other friction elements to effect its application.

---

This invention relates to disc brakes, and this application is a continuation in whole of application Ser. No. 506,151, filed Nov. 3, 1965, now abandoned, for "Disc Brakes."

The object of the present invention is to provide a disc brake having the characteristics of good heat dissipation, light weight, and simplicity of construction.

According to the invention the disc brake comprises a rotatable disc having braking surfaces formed on opposite sides thereof, a pair of friction elements axially-aligned with one another one on each side of the disc and engageable with the braking surfaces of the disc, a rigid caliper having a pair of limbs straddling a periphery of the disc, one limb of the caliper being associated with each friction element, a brake-applying mechanism associated with one limb of the caliper for moving the friction element associated with the limb axially into engagement with a braking surface of the disc, the caliper being arranged to be movable axially by reaction set up by operation of the brake-applying mechanism to cause the other limb of the caliper to move its associated friction element towards the disc, and a nonrotatable supporting framework for the caliper comprising a pair of circumferentially spaced-apart guide members extending axially adjacent a periphery of the disc from one side of the disc to the other side.

According to the invention also, a disc brake comprises a rotatable disc and a nonrotatable supporting framework comprising a pair of guide members extending axially in circumferentially-spaced positions adjacent a periphery of the disc, a pair of friction elements engageable with opposite braking surfaces of the disc and a rigid caliper positioned between the guide members and having a pair of limbs straddling the said periphery of the disc, one limb carrying a brake-applying mechanism arranged to be operated to press the friction element associated therewith towards the disc and the other limb being associated with the other friction element to move it towards the disc under the reaction set up on the caliper by the brake-applying mechanism, the said other friction element being slidably mounted on the guide members, the caliper being freely movable in the axial direction and being located with respect to the radial and the circumferential directions by its association with the said other friction element.

Preferably the guide members consist of pins on which the friction elements are slidably mounted.

One embodiment of the invention will now be described by way of example, with reference to the accompanying drawings, in which.

The accompanying drawings show a disc brake for a front wheel assembly of a motor vehicle. A braking disc 1 is fixed to the hub of the wheel assembly and is rotatable therewith.

Figure 1:
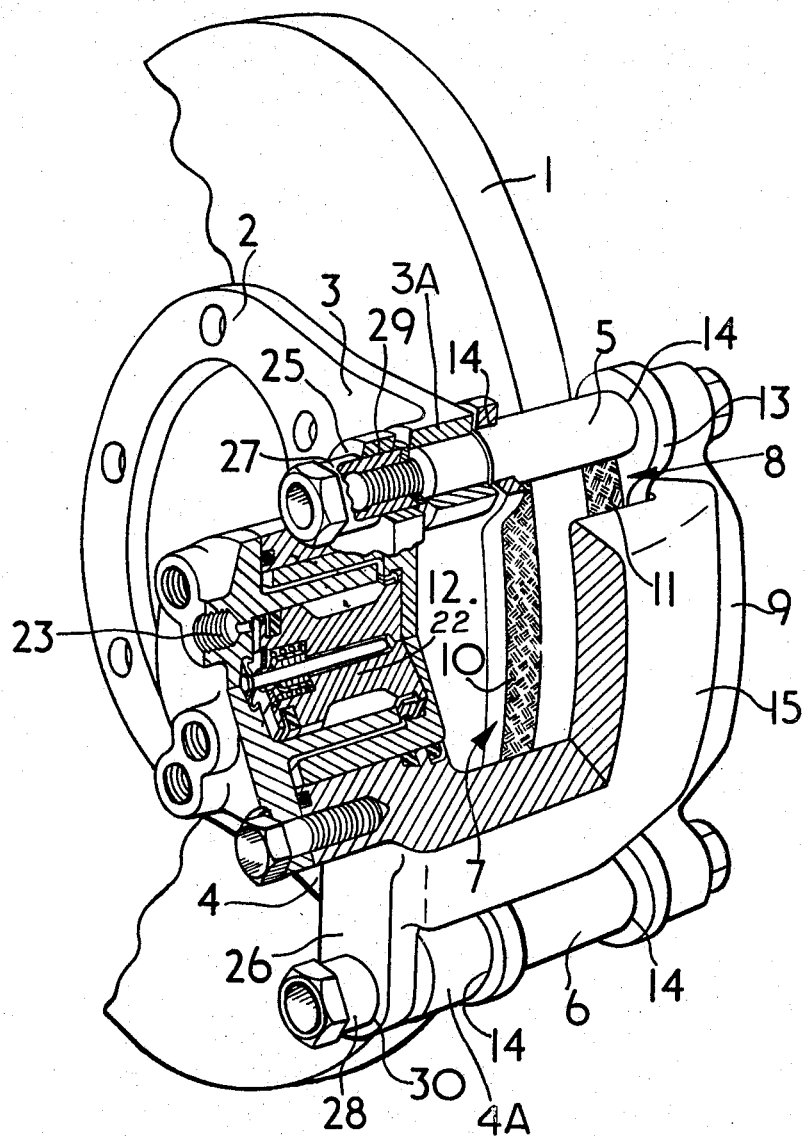
FIGURE 1 is a partly cut-away diagrammatic perspective view of part of a disc brake.

A nonrotatable support 2 is secured to the stub axle, the support 2 being formed with a pair of arms 3 and 4 extending radially therefrom in a common plane parallel to the plane of the disc 1, and the arms 3 and 4 each having an axially fixed anchoring-and-locating boss 3A and 4A respectively, which projects slightly beyond the outer periphery of the disc. The arms or limbs are angularly spaced-apart from one another and are positioned on the inner side of the disc relative to the associated vehicle so that the bosses 3A, 4A provide torque-taking surfaces formed from openings and located along one side only of said disc and disposed closely adjacent thereto as indicated in FIGURE 1, the arms being spaced from the disc so that they do not obstruct the flow of cooling air to the disc when the vehicle is in motion.

The arms 3 and 4 carry pins 5 and 6 of circular cross-section secured to the axially extending bosses 3A, 4A, the bosses providing the torque-taking surface and the pins extending in an axial direction outside the periphery of the disc 1 to form guides for a pair of friction elements 7 and 8. The axially outer ends of the pins are secured respectively to the ends of a rigid link 9 positioned on the side of the disc remote from the arms and spanning the gap between the pins to improve the rigidity of the structure.

The friction elements 7 and 8 comprise friction pads or liners 10 and 11 respectively mounted on metal backing plates 12 and 13 respectively which each extend beyond the outer periphery of the disc and include torque-taking remote ends (see FIGURE 1) which are axially slidably mounted on the guide pins 5 and 6 described above, the pins passing through holes 14 formed in the backing plates and transfer torque to the support member through the bosses.

Figure 2:
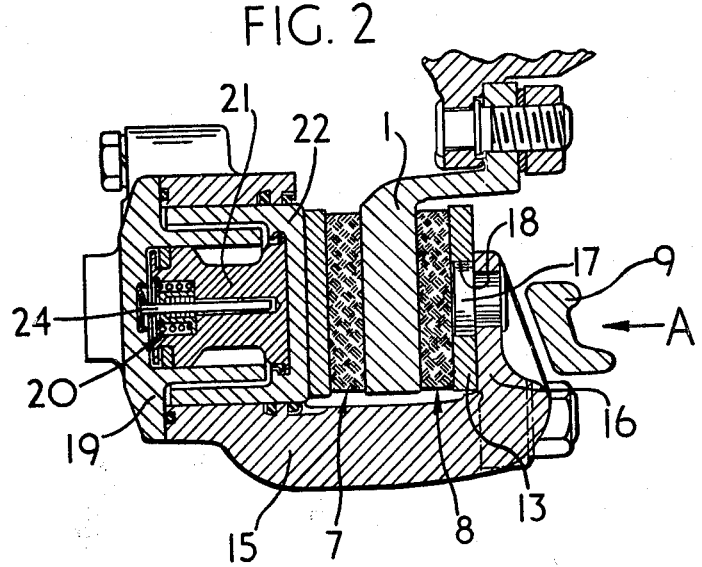
FIGURE 2 is an axial cross-section of the brake shown in FIGURE 1.
Figure 3:
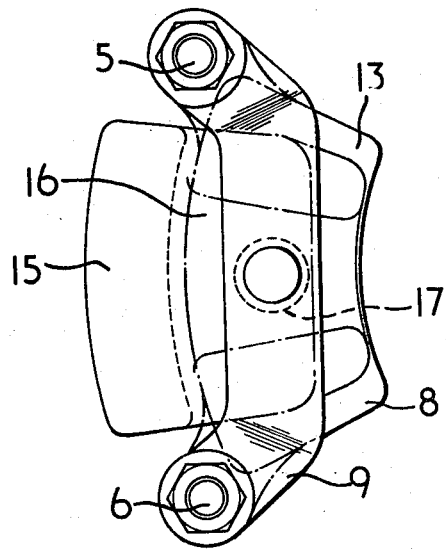
FIGURE 3 is an end view in the direction of the arrow A in FIGURE 2, showing part of the brake.

A rigid caliper 15 is positioned between the guide pins and anchoring-and-locating bosses, 3A, 4A, its outer limb 16 being attached to the outer pad backing plate by a spigot 17 (FIGURES 2, 3) secured to the limb 16 and fitting into a socket 18 formed in the backing plate 13. The caliper limbs straddle the periphery of the disc. The inner limb 19 of the caliper carries a brake-applying mechanism 20 in the form of a hydraulically-operated piston and cylinder, the piston 21 being arranged to apply pressure to the inner pad backing plate 12 through a thrust member 22. The brake-applying mechanism is supplied with fluid through an inlet 23 (FIGURE 1), and a conventional retraction mechanism 24 is provided to maintain a predetermined clearance between the friction pads and the disc in the released condition of the brake. The caliper 15 is free to move in the axial direction as the brake is applied, movement of the caliper in a plane parallel to that of the disc being restrained by the attachment of the caliper to the backing plate 13, and by the engagement of a pair of lugs 25, 26 formed on the caliper with a pair of axial extensions to the guide pins secured to anchoring-and-locating bosses 3A, 4A and are therefore complementary to the torque-taking apertured surfaces of said bosses and are slidably supported thereby at one side of said rotatable disc 1. The axial extensions consists of nuts 27, 28 which are in screw-threaded engagement with the ends of the guide pins to clamp the guide pins to the radial arms 3, 4, the nuts 27, 28 being of an elongated cylindrical form and their outer surfaces providing additional guides which pass slidably through holes 29, 30 drilled in the lugs on the caliper. Rubber bushes may alternatively be provided, the bushes being fitted slidably on the nuts and fixed in the lugs.

The disc brake described above is operated by a conventional hydraulic system controlled by a master cylinder (not shown). The brake-applying mechanism 20 forces its associated friction pad 10 into engagement with the disc 1, and the opposed friction pad 11 is then brought into engagement with the disc by axial movement of the caliper 15 under the reaction force set up by the brake-applying mechanism 20. The caliper 15 is freely movable in an axial direction relative to said anchoring-and-locating bosses 3A, 4A and is positively located with respect to the radial and circumferential directions with respect to the friction elements 7 and 8.

The disc brake described has the advantage that the stub axle of a vehicle can easily be designed to provide the radial arms 3 and 4 which form the mounting for the brake, and this results in cost and weight savings compared with conventional bolted-on brake mounting brackets. A further advantage is that the design enables the brake support to be relatively small in size and spaced axially from the braking surface of the disc, thus providing better access for cooling air.

Although the present invention has been illustrated and described in connection with the single example embodiment, it will be understood that this is illustrative of the inventon and is by no means restrictive thereof. It is reasonably to be expected that those skilled in this art can make numerous revisions and adaptations of the invention and it is intended that such revisions and adaptations of the invention will be included within the scope of the following claims as equivalents of the invention.

We claim:

1. In a disc brake including a rotatable disc the structure comprising a nonrotatable suporting framework comprising a support member for attachment to a nonrotatable vehicle mounting, said support member extending radially outwardly with respect to said brake disc adjacent one of the radially extending side faces thereof, a pair of guide members which are angularly spaced apart and each secured at one end only thereof to said support member at one side of said disc and extending axially to provide projected ends located at the other side of said disc and disposed closely adjacent the periphery of said disc, and rigid link means secured to and spanning the gap between the projected ends of said guide members, a pair of friction elements disposed one on each side of said disc to be engageable with opposite braking surfaces of the said disc, and a rigid caliper positioned between the guide members and slidably supported thereon at one side of said rotatable disc and having a pair of limbs straddling the said periphery of the disc, a brake-applying mechanism supported by one limb of said caliper and arranged to be operated to press the friction element associated therewith toward the disc and the other limb disposed in operative engagement with the other friction element to move it towards the disc under the reaction set up on the caliper by said brake-applying mechanism as said other limb is drawn toward the disc section between said guide members, the said other friction element having support surfaces slidably mounted on said guide members, said caliper being freely movable in an axial direction relatively to said guide members and located with respect to the radial and the circumferential directions by its association with the said other friction element.

2. A disc brake according to claim 1 wherein the caliper is located with respect to the radial and circumferential directions by a conection to the friction element on the side of the brake disc remote from the brake-applying mechanism.

3. A disc brake according to claim 2 wherein the caliper is also located by means of lugs formed thereon and axially slidably engageable with the guide members.

4. In a disc brake including a rotatable disc, the structure comprising a nonrotatable supporting framework having radially extending parts disposed on one side only of said rotor to provide locating surfaces adjacent one of the side faces of said rotor, said surfaces defining locating means for locating the nonrotatable parts of said disc brake, a pair of guide members having projected ends and secured to said locating surfaces and which are angularly spaced apart, and disposed closely adjacent the periphery of said disc and rigid link means secured to and spanning the gap between the projected ends of said guide members, a pair of friction elements disposed one on each side of said disc to be engageable with opposite braking surfaces of the said disc and carried by said guide members, and a rigid C-shaped caliper positioned between the guide members and slidably supported thereon at one side of said rotatable disc and having a pair of limbs straddling the said periphery of the disc, and a brake-applying mechanism supported by one limb of said caliper and arranged to be operated to press the friction element associated therewith towards the disc and the other limb disposed in operative engagement with the other friction element to move it towards the disc under the reaction set up on the caliper by said brake applying mechanism as said other limb is drawn towards the disc section between said guide members.

5. In a disc brake including a rotatable disc, the structure comprising a nonrotatable supporting frame work comprising a substantially flat support member having two radially extending outwardly projecting limbs forming a notch therebetween disposed alongside said brake disc adjacent one of the radially extending side faces thereof, a pair of combination axially fixed anchoring-and-locating members one on each of said limbs which are angularly spaced apart and extending axially to provide torque-taking surfaces located along one side only of said disc and disposed closely adjacent thereto, a pair of friction elements having means providing slidable support relatively to said anchoring-and-locating members disposed one on each side of said disc to be engageable with opposite braking surfaces of said disc, one of said friction elements consisting of an elongated friction liner and backing having slidable torque-taking remote ends adapted to operatively transmit anchoring thrust to said support member through angularly spaced complementary locations disposed closely adjacent said disc and located adjacent said pair of combination anchoring-and-locating members, a rigid caliper carried by said anchoring-and-locating members and proportioned to be positioned between the said anchoring-and-locating members and having surfaces adapted to be complementary with said torque-taking surfaces and slidably supported thereby at one side of said rotatable disc, said caliper having a pair of limbs straddling the said periphery of the disc, a brake applying mechanism supported by one limb of said caliper and arranged to be operated to press the friction element associated therewith toward the disc and the other limb disposed in operative engagement with the other friction element to move it toward the disc under the reaction set up on the caliper by said brake applying mechanism as said other limb is drawn toward said anchoring-and-locating members, said other friction element being disposed between said other limb and the associated side of said disc, said caliper being freely movable in an axial direction relative to said anchoring-and-locating members and positively located radially and circumferentially with respect to said friction elements.

6. In a disc brake including a rotatable disc, the structure comprising a nonrotatable supporting framework comprising a substantially flat support member having two radially extending outwardly projecting limbs forming a notch therebetween disposed alongside said brake disc adjacent one of the radially extending side faces thereof, a pair of combination axially fixed anchoring-and-locating members one on each of said limbs which are angularly spaced apart and extending axially to provide torque-taking surfaces located along one side only of said disc and disposed closely adjacent thereto, a pair of friction elements having means providing slidable support relatively to said anchoring-and-locating members disposed one on each side of said disc to be engageable with opposite braking surfaces of said disc, one of said friction elements consisting of an elongated friction liner and backing having slidable torque-taking remote ends adapted to operatively transmit anchoring thrust to said support member through angularly spaced complementary locations disposed closely adjacent said disc and located adjacent said pair of combination anchoring-and-locating members, a rigid caliper carried by said anchoring-and-locating members and proportioned to be positioned between the said anchoring-and-locating members and having surfaces adapted to be complementary with said torque-taking surfaces and slidably supported thereby at one side of said rotatable disc, said caliper having a pair of limbs straddling the said periphery of the disc, a brake applying mechanism supported by one limb of said caliper and arranged to be operated to press the friction element associated therewith toward the disc and the other limb disposed in operative engagement with the other friction element to move it toward the disc under the reaction set up on the caliper by said brake applying mechanism as said other limb is drawn toward said anchoring-and-locating members, said other friction element being disposed between said other limb and the associated side of said disc, said caliper being freely movable in an axial direction relative to said anchoring-and-locating members and positively located radially and circumferentially with respect to said friction elements wherein the nonrotatable supporting framework is secured to a nonrotatable front wheel assembly of a motor vehicle and said rotatable disc is fixed to the hub of the wheel assembly and is rotatable therewith.

7. In a disc brake including a rotatable disc, the structure comprising a nonrotatable supporting framework comprising a substantially flat support member having two radially extending outwardly projecting limbs forming a notch therebetween disposed alongside said brake disc adjacent one of the radially extending side faces thereof, a pair of combination axially fixed anchoring-and-locating members one on each of said limbs which are angularly spaced apart and extending axially to provide torque-taking surfaces located along one side only of said disc and disposed closely adjacent thereto, a pair of friction elements having means providing slidable support relatively to said anchoring-and-locating members disposed one on each side of said disc to be engageable with opposite braking surfaces of said disc, one of said friction elements consisting of an elongated friction liner and backing having slidable torque-taking remote ends adapted to operatively transmit anchoring thrust to said support member through angularly spaced complementary locations disposed closely adjacent said disc and located adjacent said pair of combination anchoring-and-locating members, a rigid caliper carried by said anchoring-and-locating members and proportioned to be positioned between the said anchoring-and-locating members and having surfaces adapted to be complementary with said torque-taking surfaces and slidably supported thereby at one side of said rotatable disc, said caliper having a pair of limbs straddling the said periphery of the disc, a brake applying mechanism supported by one limb of said caliper and arranged to be operated to press the friction element associated therewith toward the disc and the other limb disposed in operative engagement with the other friction element to move it toward the disc under the reaction set up on the caliper by said brake applying mechanism as said other limb is drawn toward said anchoring-and-locating members, said other friction element being disposed between said other limb and the associated side of said disc, said caliper being freely movable in an axial direction relative to said anchoring-and-locating members and positively located radially and circumferentially with respect to said friction elements, and wherein the nonrotatable portion of the front wheel assembly of the motor vehicle is comprised of a stub axle.

8. In a disc brake including a rotatable disc, the structure comprising a nonrotatable supporting framework comprising a substantially flat support member having two radially extending outwardly projecting limbs forming a notch therebetween disposed alongside said brake disc adjacent one of the radially extending side faces thereof, a pair of combination axially fixed anchoring-and-locating members one on each of said limbs which are angularly spaced apart and extending axially to provide torque-taking surfaces located along one side only of said disc and disposed closely adjacent thereto, a pair of friction elements having means providing slidable support relatively to said anchoring-and-locating members disposed one on each side of said disc to be engageable with opposite braking surfaces of said disc, one of said friction elements consisting of an elongated friction liner and backing having slidable torque-taking remote ends adapted to operatively transmit anchoring thrust to said support member through angularly spaced complementary locations disposed closely adjacent said disc and located adjacent said pair of combination anchoring-and-locating members, a rigid caliper carried by said anchoring-and-locating members and proportioned to be positioned between the said anchoring-and-locating members and having surfaces adapted to be complementary with said torque-taking surfaces and slidably supported thereby at one side of said rotatable disc, said caliper having a pair of limbs straddling the said periphery of the disc, a brake applying mechanism supported by one limb of said caliper and arranged to be operated to press the friction element associated therewith toward the disc and the other limb disposed in operative engagement with the other friction element to move it toward the disc under the reaction set up on the caliper by said brake applying mechanism as said other limb is drawn toward said anchoring-and-locating members, said other friction element being disposed between said other limb and the associated side of said disc, said caliper being freely movable in an axial direction relative to said anchoring-and-locating members and positively located radially and circumferentially with respect to said friction elements and wherein said other limb is mechanically secured to the confronting surface of said other friction element to effect a mechanical coupling between the backing of said other friction element and said other limb.

References Cited

UNITED STATES PATENTS

| | | |
|---|---|---|
| 2,531,341 | 11/1950 | Meador. |
| 2,820,530 | 1/1958 | Chouing et al. _____ 188—73 |
| 2,966,964 | 1/1961 | Brueder _____ 188—73 |
| 3,003,587 | 10/1961 | Garrett _____ 188—73 XR |
| 3,280,933 | 10/1966 | Jones _____ 188—73 XR |

FOREIGN PATENTS 1,146,983    5/1957    France.

FERGUS S. MIDDLETON, *Primary Examiner.*

G. E. HALVOSA, *Assistant Examiner.*